United States Patent
Hyndman et al.

(10) Patent No.: US 7,783,194 B2
(45) Date of Patent: Aug. 24, 2010

(54) METHOD AND APPARATUS FOR PROVISIONING OPTICAL SERVICES ON AN OPTICAL NETWORK

(75) Inventors: Arn Hyndman, Ottawa (CA); John Lynk, Nepean (CA)

(73) Assignee: Ciena Corporation, Linthicum, MD (US)

( * ) Notice: Subject to any disclaimer, the term of this patent is extended or adjusted under 35 U.S.C. 154(b) by 1038 days.

(21) Appl. No.: 11/301,718

(22) Filed: Dec. 13, 2005

(65) Prior Publication Data

US 2006/0126521 A1 Jun. 15, 2006

Related U.S. Application Data

(60) Provisional application No. 60/635,526, filed on Dec. 13, 2004.

(51) Int. Cl.
*H04J 14/00* (2006.01)

(52) U.S. Cl. .............................. 398/57; 398/45; 398/48; 370/248; 370/254; 709/224; 709/223

(58) Field of Classification Search ................... 398/69, 398/16, 25, 27, 34, 48, 49, 57, 58, 50, 56; 370/248, 254, 225, 241, 221; 709/224, 223, 709/226, 248

See application file for complete search history.

(56) References Cited

U.S. PATENT DOCUMENTS

| | | | | |
|---|---|---|---|---|
| 6,094,682 A | * | 7/2000 | Nagasawa | 709/224 |
| 6,654,802 B1 | * | 11/2003 | Oliva et al. | 709/224 |
| 7,190,902 B2 | * | 3/2007 | Solheim et al. | 398/69 |

* cited by examiner

*Primary Examiner*—Hanh Phan
(74) *Attorney, Agent, or Firm*—Christopher & Weisberg, P.A.

(57) ABSTRACT

An optical provisioning system includes a connection tree table that allows a path to be traced through the network using connection ID, rate, and other information at the nodes on the network. As connections are built, a connection graphics panel is provided to display a representation of the network elements and topology between the network elements. Where topology is not known, it may be entered into the optical provisioning system and shown using a different graphical display element. Within a node, the connections may be built by specifying protection, routing, and optionally concatenation, via a visually intuitive user interface. Termination for the connection may be specified using a port and payload selector dialog that enables information associated with the port to be displayed to improve the port selection process and enables available channels to be viewed in a graphical manner.

9 Claims, 10 Drawing Sheets

Figure 4

| | ID | Role | NEA | NEZ | Status | Type | Configuration |
|---|---|---|---|---|---|---|---|
| 410 | Connection-1 | STS-1 | 206 Ottawa | 47294 San Francisco | OK | Path | |
| 420 | Connection-1 | STS-1 | 206 Ottawa | 231 Washington | OK | BLSR | NorthRing |
| 422 | Connection-1 | STS-1 | 206 Ottawa | | OK | Nodal | |
| 424 | Connection-1 | STS-1 | 203 Churchill | | OK | Nodal | |
| 426 | Connection-1 | STS-1 | 202 Edmonton | | OK | Nodal | |
| 428 | Connection-1 | STS-1 | 231 Washington | | OK | Nodal | |
| 430 | Connection-1 | STS-1 | 231 Washington | 47294 San Francisco | OK | BLSR | Western Ring |

Figure 5

| | ID | Role | NEA | NEZ | Status | Type | Configuration |
|---|---|---|---|---|---|---|---|
| 550 | [VCAT] Connection-1 | STS-1-3v | 206 Ottawa | 249 Oakland | OK | Path Group | |
| 552 | Connection-1 | STS-1 | 206 Ottawa | 249 Oakland | OK | Path | |
| 554 | Connection-1 | STS-1 | 206 Ottawa | 249 Oakland | OK | Path | |
| 556 | Connection-1 | STS-1 | 206 Ottawa | 249 Oakland | OK | Path | |
| 560 | Connection-1 | STS-1 | 206 Ottawa | | OK | Nodal | |
| 562 | Connection-1 | STS-1 | 203 Churchill | | OK | Nodal | |
| 564 | Connection-1 | STS-1 | 202 Edmonton | | OK | Nodal | |

METHOD AND APPARATUS FOR PROVISIONING OPTICAL SERVICES ON AN OPTICAL NETWORK

CROSS REFERENCE TO RELATED APPLICATIONS

This application is related to and claims the benefit of U.S. Provisional Application No. 60/635,526, filed Dec. 13, 2004, entitled "Visuals and Method for Specifying Arbitrary Connection Routing and Protection Functions," the content of which is hereby incorporated herein by reference.

BACKGROUND OF THE INVENTION

1. Field of the Invention

The present invention relates to network management and, more particularly, to a method and apparatus for provisioning optical services on an optical network.

2. Description of the Related Art

Data communication networks may include various routers, switches, bridges, hubs, and other network devices coupled to and configured to pass data to one another. These devices will be referred to herein as "network elements." Data is communicated through the data communication network by passing protocol data units, such as Internet Protocol (IP) packets, Ethernet frames, data cells, segments, or other logical associations of bits/bytes of data, between the network elements by utilizing one or more communication links between the devices. A particular protocol data unit may be handled by multiple network elements and cross multiple communication links as it travels between its source and its destination over the network.

In optical networks, the connections between the elements must be provisioned to enable data to be passed over the optical network. The connections are statically provisioned through the network so that a particular service instance will be connected between ports on network elements and remain provisioned over those ports until the provisioning is changed or shut down. For example, once the optical network elements are interconnected by optical fibers, a network manager will log into an optical service provisioning system to set up data connections (services) through the network elements and optical fibers. Examples of commonly offered services include T1, T3, etc.

Conventionally, provisioning of services has been done manually on a work-order basis. Specifically, when a new service is to be provisioned, the network manager will log into the optical service provisioning system to define the network resources that are to be used to implement the service. Although automatic provisioning systems have been created, due to the complexity of connection options, service providers tend to prefer the manual method of provisioning services due to the increased ability to control the manner in which the services are created.

Optical connection management is quite complex, due to the different ways in which a service may be created on the optical network. For example, a given service may require path and line protection, concatenation of services, and layering of services. Since optical services are offered in blocks of bandwidth of a particular size (channels), it is often necessary to concatenate several channels together to build a service of the desired bandwidth. Since these concatenated channels may be physically carried on different paths through the network, the manner in which they are protected may be different for each concatenated block of bandwidth. Additionally, the underlying transport mechanisms may be different which also complicates the manner in which a service must be provisioned.

To address these issues, optical service provisioning systems have been developed that enable a network manager to specify how a service should be specified between network elements and within a given network element. Unfortunately, the optical service provisioning systems require extensive training and require the network manager to remember a significant amount of information. Thus, it is not uncommon for it to take an experienced network manager about 30 minutes to set up one backbone connection using existing optical provisioning systems.

Several factors contribute to the complexities associated with optical provisioning. For example, the vendors that design optical networking equipment haven't agreed on a standard to be used for topology discovery, and there generally is limited proprietary auto-discovery. Thus, discovery of the network topology in a network created using network elements from multiple vendors creates gaps in the system knowledge, resulting in visualization of the network that is limited at best. These gaps in topology were generally required to be input using a topology program which was separate from the optical provisioning system. Since the two systems were separate, the network manager would need to stop provisioning the service, cause the topology to be entered, and then continue the provisioning process.

Additionally, the network elements typically only store nodal connection data so that the information that is available generally is associated with connections through a particular node, rather than paths across the network. Specifically, the network elements themselves only know that a connection on one input port is routed out through another output port. The nodal data stored by the network element for the connection frequently may be quite limited, for example including a 40 character connection ID. Since services are typically based on end-to-end connections or collections of such connections, the nodal data is of limited value to tracing existing connections through the network. While systems exist that will allow a single path to be derived by walking a series of nodal connections and topology, these systems are limited in many ways. Specifically, in their ability to deal with the concept of several individual paths being concatenated to form one service, in dealing with gaps in topological information, and in the manner in which they described these derived path(s).

In addition to the limitations associated with knowledge of the underlying network, the network manager must also contend with the complexities of describing the service that is to be created on the network. For example, a given nodal connection may need different combinations of protection, concatenation, and routing functions. The complex functions also require a large number of termination points to be specified. Even without concatenation, the number of connection types may be quire large and is continuing to increase. Existing terminology and user interface designs are concomitantly complex and either require the network manager to remember a large number of acronyms for the particular connection type to be established through the network element, or require the network manager to use multiple clicks to extract the correct connection from the user interface.

Finally, within a network element it may be difficult to select the correct port or ports to handle the connection. Port naming is relatively complex, which may make it difficult to identify the correct port or ports for an intended service. Additionally, when selecting between ports, the destination of the service may constrain the port selection process since only particular ports may connect to a given destination.

Since the nodes may not know which port is connected to a particular destination, selecting the proper port may be difficult. Additionally, once a port is selected, one or more levels of channel selection within the port may need to be specified as well. Where the port does not have sufficient channels to support an intended connection, the channel selection process may require a new port selection to occur. Additionally, different customers use different modes of operation which further makes it difficult to implement port selection using existing user interfaces.

Accordingly, it would be advantageous to provide a method and apparatus for provisioning optical services on an optical network that may be able to improve on one or more of these deficiencies in current optical provisioning systems.

SUMMARY OF THE INVENTION

A method and apparatus for provisioning optical services on an optical network is provided that includes a user interface designed to streamline the manner in which data is displayed, and through which a network manager may provision services in a more intuitive manner. The main window includes a connection tree table that allows a path to be traced through the network from a given connection using existing topological information, concatenation port information, rate information, connection ID information, and other information available at the nodes on the network. Tracing a path from a given connection enables a view of the service associated with that connection to be approximated, since it will enable the optical provisioning system to show the network manager which other connections on the network are associated with a path that passes through the selected connection. This allows the network manager to visualize how the selected connection fits into the path or path group.

The optical provisioning system enables new paths to be created on the optical network through the use of a path editor. The path editor has a connection graphics panel designed to display network elements and topology between the network elements as the path is built. Optionally, the connection graphics panel may show implicitly known topology from explicitly created topology. This enables the path editor to visually convey which topology is known to the system implicitly, and which topology was created across unknown network topology through user input. Moreover, the network manager may input topology into the optical provisioning system and cause the optical provisioning system to accept the topology information so that the network manager may continue to provision services even in the absence of full topology knowledge.

The path editor also includes a nodal connection details area configured to enable the connection within a node to be built by allowing the user to specify protection and routing, and optionally concatenation. By enabling the user to build a connection through the node, rather than remember the connection, the user is able to visually verify that the connection through the node is the correct type of connection. The nodal connection details area is graphically arranged to permit more intuitive creation of connections through the node.

The path editor enables a dialog to be created through which the network manager may select port and payload information associated with a termination of a connection being created. The port and payload selector dialog includes a port selector area configured to provide information associated with available ports and via which the network manager may select a port for the termination. The port and payload selector dialog also includes a payload selector area containing one or more panels in which grids of payload selectors may be displayed. The payload selectors enable the network manager to visually identify which channels have been allocated and which are available to be assigned to a particular connection. Optionally, a concatenation area may be provided via which the network manager may add multiple connections together to form a single concatenated termination for the connection.

Other aspects of the invention will become apparent from the following description, and this Summary of the Invention is not intended to limit the scope of the claims but rather is intended to provide an overview of some of the unique aspects of the system that is described in greater detail below.

BRIEF DESCRIPTION OF THE DRAWINGS

Aspects of the present invention are pointed out with particularity in the appended claims. The present invention is illustrated by way of example in the following drawings in which like references indicate similar elements. The following drawings disclose various embodiments of the present invention for purposes of illustration only and are not intended to limit the scope of the invention. For purposes of clarity, not every component may be labeled in every figure. In the figures:

FIG. 4 is a connection tree table portion of the main window of FIG. 3 populated with an example selection of connections;

FIG. 5 is the connection tree table of FIG. 4 showing the example selection of connections as they appear after execution of a trace function according to an embodiment of the invention;

DETAILED DESCRIPTION

The following detailed description sets forth numerous specific details to provide a thorough understanding of the invention. However, those skilled in the art will appreciate that the invention may be practiced without these specific details. In other instances, well-known methods, procedures, components, protocols, algorithms, and circuits have not been described in detail so as not to obscure the invention.

Figure 1:
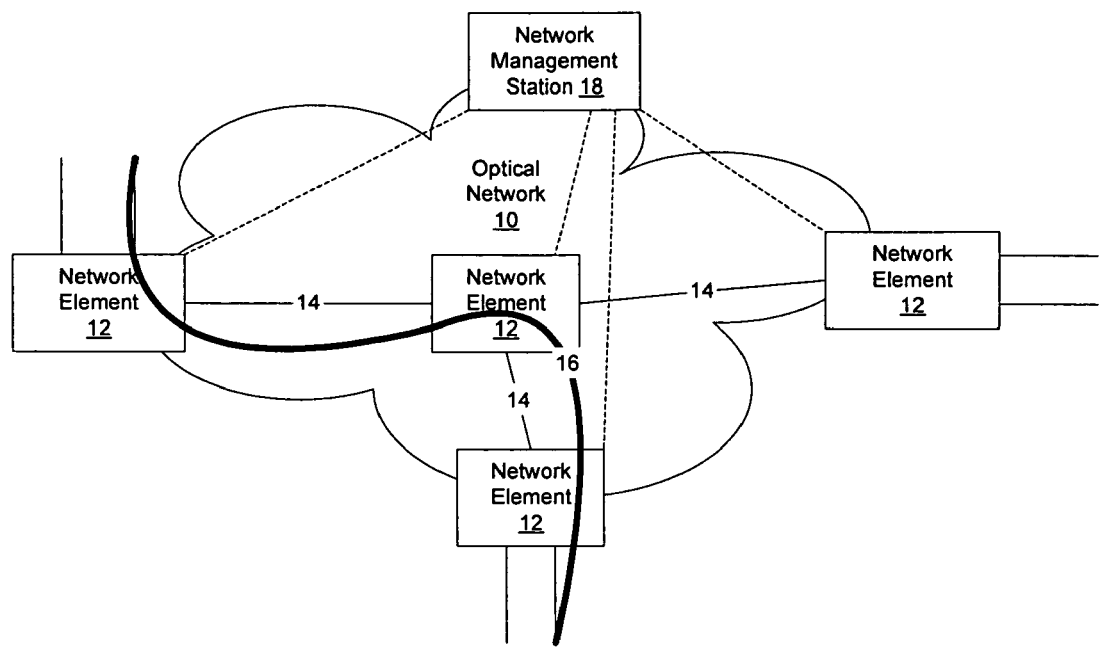
FIG. 1 is a functional block diagram of an example optical communication network.

FIG. 1 illustrates an example of a portion of an optical network over which optical services may be provisioned. As shown in FIG. 1, an optical network 10 generally includes a plurality of network elements 12 interconnected by optical links 14. Services 16 may be provisioned through the optical network by defining connections through the network elements 12 that will enable data to be passed over a particular path including selected optical links. A network management station 18 may be provided to provision the optical services on the optical network.

As used herein, the term connection will be used to refer to a manner in which ports are connected within a given node or network element. Links extending between network elements will be referred to as "topology". The network topology is the way in which the optical fibers or other communication links are interconnected between the network elements. A path is created by setting up the connections within the nodes so that the correct topology may be used to transport data from one side of the network to the other. Two or more paths may be grouped together to form a path group. A service may be provisioned over a path or path group on the network.

To provision a service, the network manager will access the management station 18 and specify which connections should be made to create a path for the service. Once the network manager has defined the connections that should be used to create the path, the network management station will cause each defined connection to be actually implemented on the network by appropriate signaling or other messaging between the network management station and the network elements.

Figure 2:
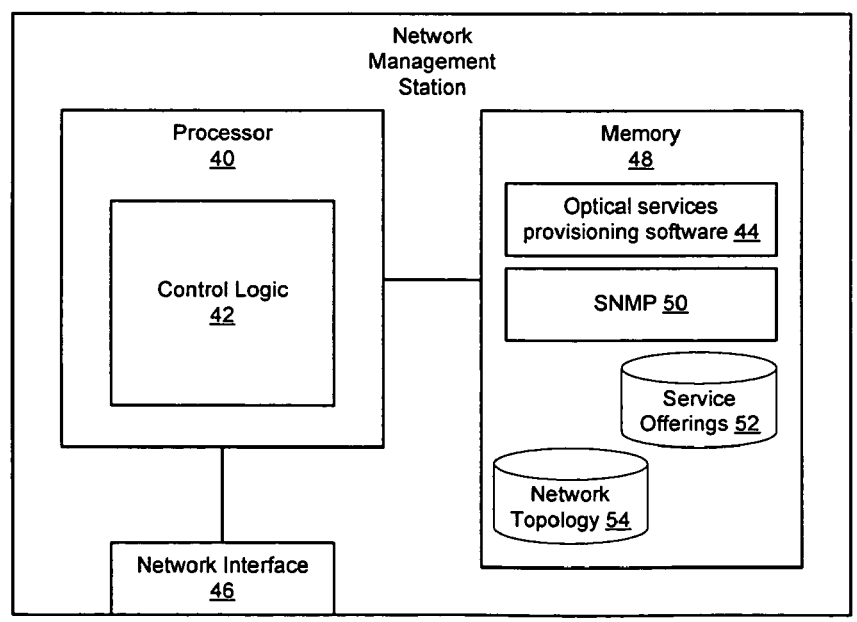
FIG. 2 is a functional block diagram of a network management station configured to run optical services provisioning software according to an embodiment of the invention.

FIG. 2 illustrates one example of a network management station 18. As shown in FIG. 2, the network management station 18 generally includes a processor 40, containing control logic 42 configured to enable the network management station to execute program instructions associated with optical services provisioning software 44. The network management station may also include one or more network interface 46 configured to enable the network management station 18 to communicate with the network elements 12 on the optical network 10.

The network management station 18 includes a memory 48 configured to hold data and instructions associated with the optical services provisioning software 44 and optionally other software and databases configured to enable the network management station to operate on the network. For example, the network management station 18 may include a Simple Network Management Protocol (SNMP) software program 50 configured to enable the network management station to communicate with network elements using SNMP. The network management station 18 may also contain a service offerings database 52 and network topology database 54 configured to hold information associated with service offerings that have been provisioned on the network and the underlying network topology. The invention is not limited to the particular network management station illustrated in FIG. 2, as many different types of network management stations may be implemented according to embodiments of the invention.

Optical Provisioning System Main Window

Figure 3:
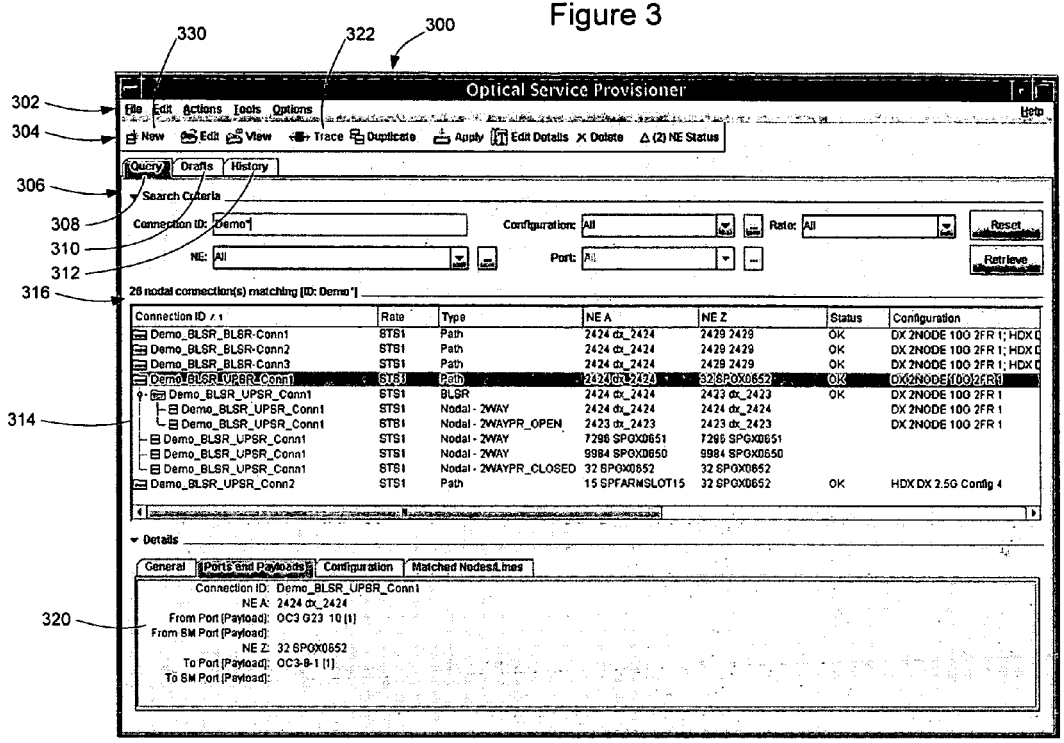
FIG. 3 is a screen shot illustrating a main window of an optical services provisioning system according to an embodiment of the invention.

FIG. 3 illustrates one possible implementation of an optical provisioning system main window 300 of the Graphic User Interface (GUI) that appears when the optical service provisioning software is launched. In the embodiment shown in FIG. 3, the main window 300 allows users to query, edit, delete and trace connections, view a list of connections that have been prepared but have not been provisioned in the network ("Drafts"), view a list of connections that have been provisioned to the network in the open session ("History"), launch other dialogs that allow the user to provision new connections, duplicate existing connections, and view connections in more detail, and set preferences for the entire client session. Other user interfaces may be used as well, and the invention is not limited to use with the particular window shown in FIG. 3.

To enable the users to implement these functions, as shown in FIG. 3, the main window 300 is broken up in a menu bar 302, a tool bar 304, and three tabbed panes 306 (each with a tree table)—a query tab 308, a drafts tab 310, and a history tab 312. The query tab 308 enables the user to obtain a list of connections in the network that match a user-initiated query. The drafts tab enables the user to review a list of unprovisioned or partially provisioned connections waiting to be sent to the network. The history tab enables the user to see a list of connections that have been successfully provisioned to the network in this session of the OSP application. Many options may be available via the main menu and toolbar and the invention is not limited to any particular combination of available options. Accordingly, additional details associated with operation of the main menu and toolbar have been omitted.

Path Trace

The main window also includes a connection tree table 314. The connection tree table provides a placeholder for connections to be displayed when using the query tab, the drafts tab, and the history tab. The connection tree table 314 allows the user to scroll up and down the list of results in order to view all connections within the list. The number of connections that are listed in the tree table is provided at the top of the table (316), along with the launch and search criteria that was queried.

The connection tree table 314 enables path groups, paths, subnetwork, and nodal connections to be shown textually in the main window. The connection tree table is configured to display columns of information for each connection in the list. For example, the connection tree table may display the connection ID, a description of the connection, the rate, the network elements associated with the connection, the status of the connection, the type of connection, the service owner, and many other types of information. The invention is not limited to the particular types of information to be displayed in the connection tree table.

To view details about, open in path editor, duplicate, trace, edit, or delete a particular connection, the user may select a connection from the connection tree table. This may be performed, for example, by moving the cursor over a connection to cause it to be highlighted as shown in FIG. 3. Once a connection is selected, a connection details portion 320 of the main window 300 will be populated with the detailed information associated with the selected connection.

It is possible to trace a path across the network using a trace button 322 in the query tab 308 associated with a sub-network or nodal connection. The trace function may be performed even if the selected connection exists within an already traced path or within a path group connection. The trace function causes the complete path for the selected connection to be traced.

To cause the optical provisioning system to trace a path, the user selects a nodal or sub-network connection in the connection tree table 314. For example, as shown in FIG. 4, the user may select a connection by highlighting the connection such as connection 422. Once a connection has been selected, the optical provisioning system will enable the trace button 322 in the main window 300. If the user selects the trace button 322, the optical provisioning system will trace the complete path and path group for the selected connection. The optical provisioning system will then update the connection tree table 314 with the new entries, remove any tree table duplicates, and automatically select the newly traced path.

FIG. 4 shows an example of the connection tree table 314 after performing a connection trace. As shown in FIG. 4, the connection trace function causes the underlying path 410 from Ottawa to San Francisco to appear, to indicate that the selected connection is part of the service provisioned from Ottawa to San Francisco. As shown under the type column 440, the optical provisioning system has indicated that entry 410 is a "path" type indicating that the entries under it form portions of the path through the network which, in this instance, extends from Ottawa to San Francisco.

Several entries 420, 430 have been entered under the main path entry 410, indicating that these connections are part of the path from Ottawa to San Francisco. Entry 420 indicates that a first segment of the path from Ottawa to Washington is carried on a BLSR. Entries 422, 424, 426, and 428 show a series of nodal connections on the ring. The second segment from Washington to San Francisco is carried on another BLSR. By graphically showing the connections on the path, and enabling information about the path to be displayed, it is possible to view the path through the network as well as see the individual segments on the path.

FIG. 5 shows another example of the connection tree table in which a path group is shown as extending from Ottawa to Oakland. The first entry 550 in the connection tree table has a type of "path group" indicating that it is associated with a group of paths that together approximate a service on the network. The paths within the path group are shown as entries 552, 554, 556 immediately below the path group entry 550. The paths may follow the same path through the network or may follow different paths through the network. Nodal connection details associated with each of the paths may be provided as well. For example, in FIG. 5 connection 556 takes place over three nodal connections 560, 562, 564. Similar details may be provided for the other connections as well.

The trace function is used to link related nodal connections into path segments where topology exists, and can also leverage implicit topology if it exists to build larger segments. Heuristics are used on connection ID, shared WAN ports, and other available information, to relate path segments into a path group. Optionally, user input (explicit information) may be leveraged to further relate path segments. Where the user knows additional connection(s) exist in the path that is being traced, the user may instruct the optical provisioning system to trace the additional connection(s) as well and add the paths traced from the additional connection(s) to the current path being traced.

The ability to trace a connection enables the connection to be handled individually to determine the path through the network that is associated with that connection. This enables the optical provisioning system to build a view to approximate a service view for the user to provide greater insight into the manner in which the service is provisioned on the network.

As mentioned above, the nodes only have nodal information and don't have a network view of how services are provided through the network. The trace function enables a view of the service to be created automatically from data stored on the nodes that is associated with inter-nodal and nodal connections. For example, the connection trace function may use connection ID information, rate information, WAN information, and other information on the various nodes to determine the path of a particular connection through the network. Although there is no strict requirement that the same connection ID be used in all network elements, since people generally use the same connection ID for a particular connection on the network, the trace function may use the connection ID to find pieces of the path through the network that otherwise may not be visible to the user. Similarly, the rate on the path will not change as the path proceeds through the network. Thus, the connection rate may be used to determine which connections at adjacent network elements are likely to be associated with the path that passes through the selected connection.

Figure 6:
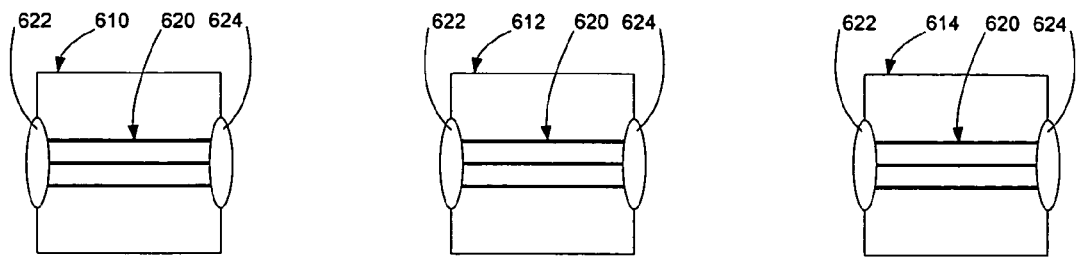
FIG. 6 is functional block diagram illustrating the data that is supplied by network elements during a connection trace function.
Figure 7:
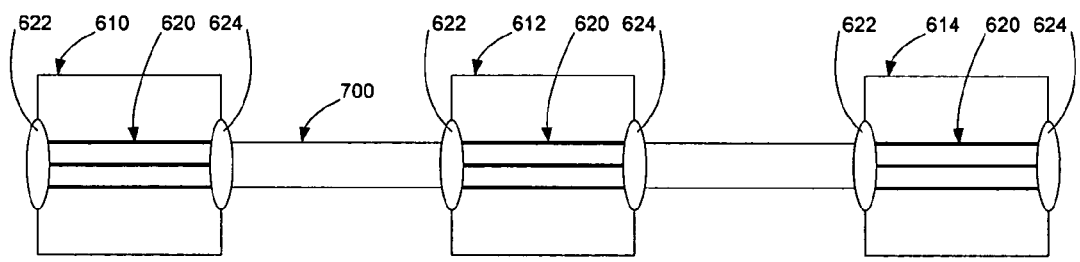
FIG. 7 is a functional block diagram illustrating a path that may be created from the data supplied by the network elements during performance of a connection trace function.

FIG. 6 shows graphically the data that is supplied by the network elements. As shown in FIG. 6, the network elements 610, 612, and 614 provide data to the optical provisioning system that particular connections 620 have particular rates, are provisioned from input ports 622 to output ports 624 on those network elements. Using the connection IDs, topology information, WAN information, connection rate information, and other available information associated with the connection data supplied by the network elements, the optical provisioning system is able to determine the path or path group 700 through the network as shown in FIG. 7. The path group, in the example shown in FIG. 7, includes the three paths formed from the connections 620 through the network elements.

New Path

Figure 8:
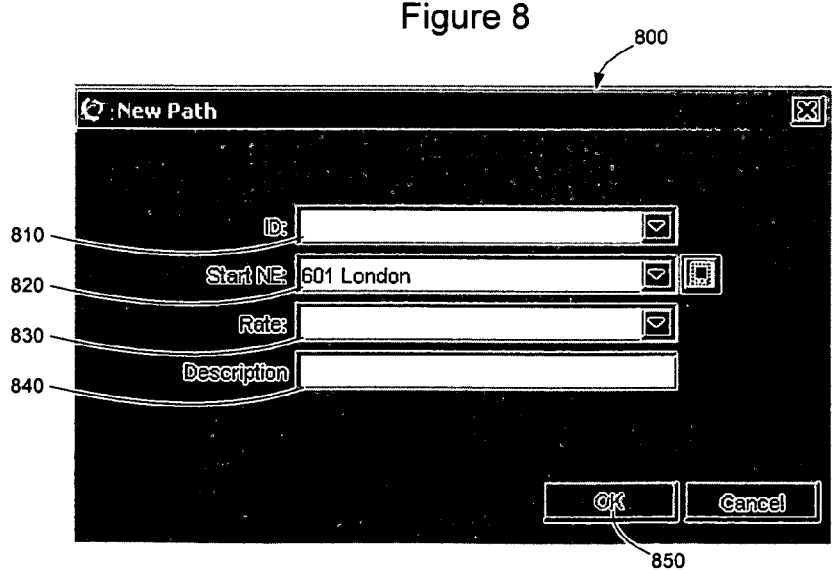
FIG. 8 is a new path dialog box that may be used to provision an optical service according to an embodiment of the invention.

When the user clicks on the new path button 330 from main window toolbar, a new path dialog box is displayed. FIG. 8 illustrates one example of a new path dialog box 800 that may be used. The new path dialog is a modal dialog box (relative to the main window) that allows the user to specify path attributes such as connection ID 810, start network element 820, rate 830, and optionally a connection description 840. It is foreseeable that other attributes may also be specified in this New Path Dialog. If the main window is launched off a network element, then the network element in context is automatically selected in the start NE combo box. Otherwise, the last used start network element may be used. Optionally, the user can also launch a find network element dialog to search for a desired network element and use the located network element as the start network element. After the user clicks on the OK button 850 a new path is created and a path editor 900 (See FIG. 9) is launched with the selected start network element. The new path is merely a "skeleton" and therefore it is not a provision-able entity.

Figure 9:
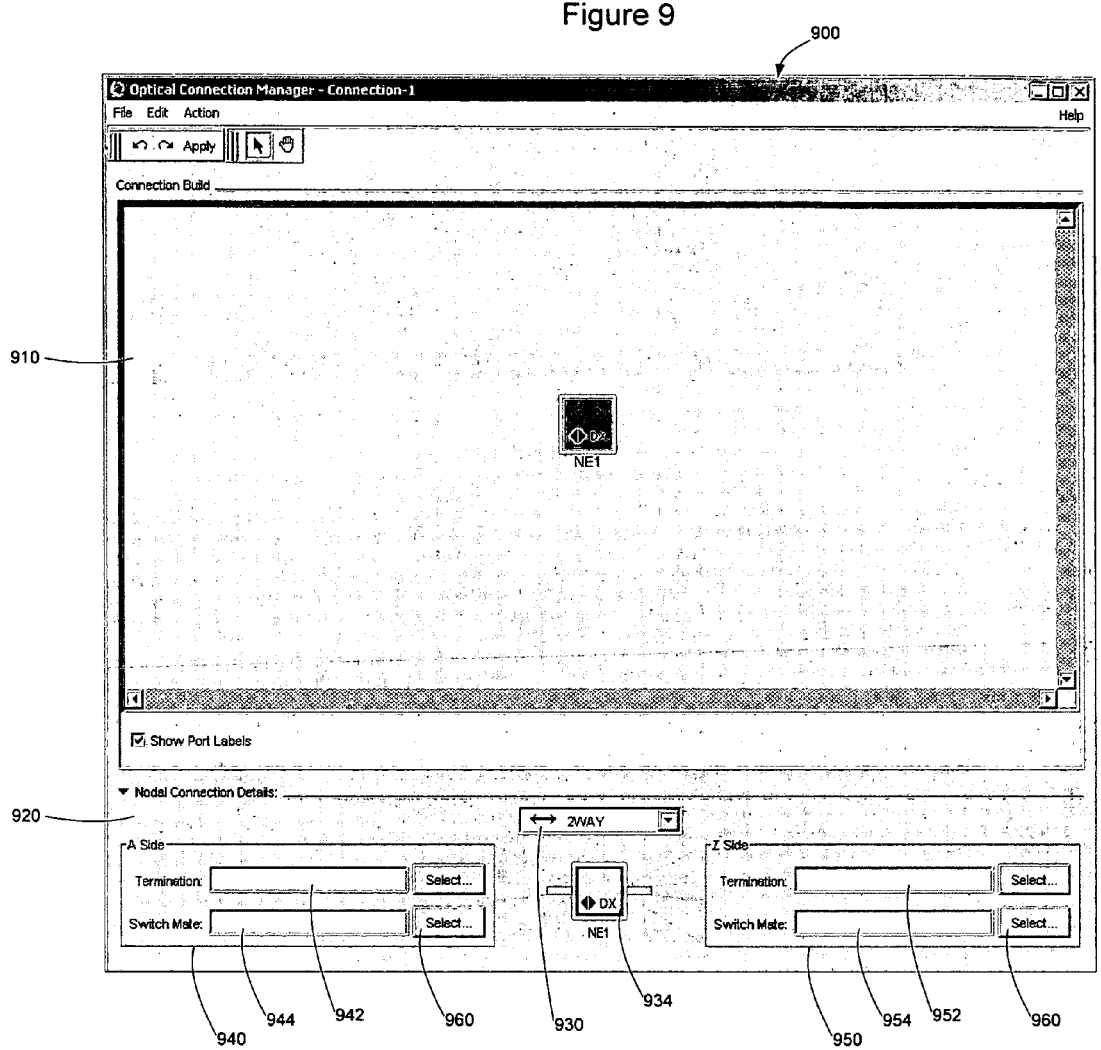
FIG. 9 is a path editor dialog box that may be launched as part of the optical services provisioning system, for example from the new path dialog box of FIG. 8, according to an embodiment of the invention.

Paths may be edited using a path editor 900, one example of which is shown in FIG. 9. The path editor may be launched in several different ways. For example, the user may click on the new path button 330 from the main window will invoke the new path dialog box shown in FIG. 8, which in turn will launch the path editor of FIG. 9. Alternatively, the user may select an existing path and click on an edit path button to invoke the path editor against the selected path. Selecting an existing path, followed by clicking on the view button will also invoke the path editor against the selected path in a read-only mode. The path editor may also be opened in other ways depending on the implementation of the optical provisioning system.

To provision a path, the user will define connections through network elements to cause the desired topology to be associated with the path. For example, the user may repeat the following general steps on every network element in the intended path until the path is complete: (1) choose a connection type; (2) choose the A-side termination; (2a) if necessary, chose the A-side switch mate termination (3) choose the Z-side termination; (3a) if necessary, choose the Z-side switch mate termination; and (4) Select an on-page connector to advance to the next network element. If network topology is not available, the user may explicitly continue to the next network element via a right-click "explicit continue" menu item. (If topology is not available, an off page connector will thus appear as discussed in greater detail below, indicating that the network topology was explicitly created and additional network elements may actually be present.) This process is repeated until the user reaches the end of the path.

The path editor 900 has a connection graphics panel 910 showing a graphical representation of the connection through the network, and a nodal connection details panel 920 that may be used to show details associated with a particular connection being created or edited on the path.

As the user selects a network element in the connection graphics panel 910, the nodal connection details panel 920 is updated based on that selection. The user may then build the connection by inputting information into the nodal connection details panel as discussed in greater detail below.

Figure 11A:
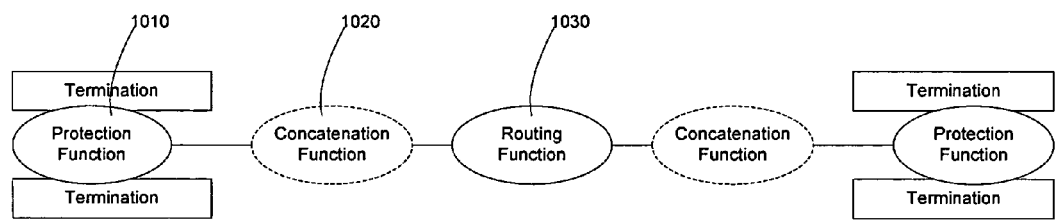
FIG. 11A is a functional block diagram illustrating a collapsed version of the problem space of FIG. 10 according to an embodiment of the invention.
Figure 11B:
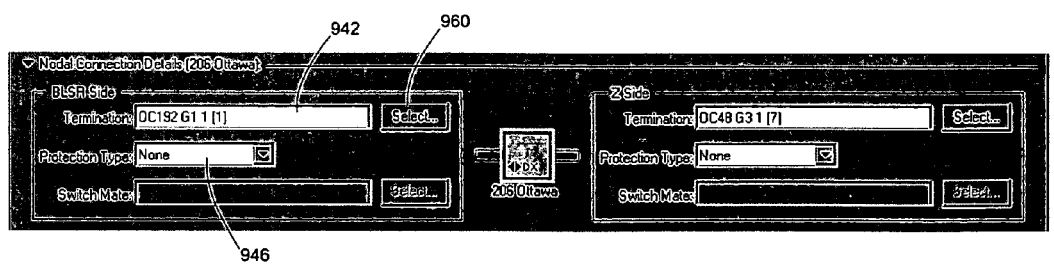
FIG. 11B is an example of a nodal connection details area of the path editor dialog box of FIG. 9 according to an embodiment of the invention.

The nodal connection details panel may be implemented as shown in FIG. 9 or, alternatively, as shown in FIG. 11B. In the embodiment shown in FIG. 9, the nodal connection details panel includes a connection type combo box 930 configured to display the selected nodal connection's type and an image icon that represents the orientation of the connection. Many different types of connections may be created and new connection types may continue to be developed. In the embodiment shown in FIG. 9, the connection type is specified by the user by causing the connection type to be selected from a list of available connection types. In an alternative embodiment, as shown in FIG. 11B, the connection type may be built by specifying separate aspects of the connection and then allowing the appropriate connection type to be created based on the selected functional aspects of the connection. In each of the embodiments shown in FIGS. 9 and 11B, it is possible for the A side termination area 940 and Z side termination area 950 to switch sides if the connection orientation is backwards. The connection orientation depends on how the connection relates to the path being created or edited and which is shown in the connection graphics panel 910.

The way in which the path editor 900 presents information enables complex connection options and device specific constraints to be broken down so that the protection, concatenation, and routing functions may be handled independently. In and out ports may be grouped for each function and network element graphic and user interface grouping features may be used to graphically show relationships. In this manner it becomes much easier to specify a connection through a node on a path so that the path may be built on the network in a more streamlined manner. Additionally, as discussed below, the payload to be used on each port may be specified as the port is being selected, so that the port and payload selection processes may be combined to further simplify the provisioning process.

Figure 10:
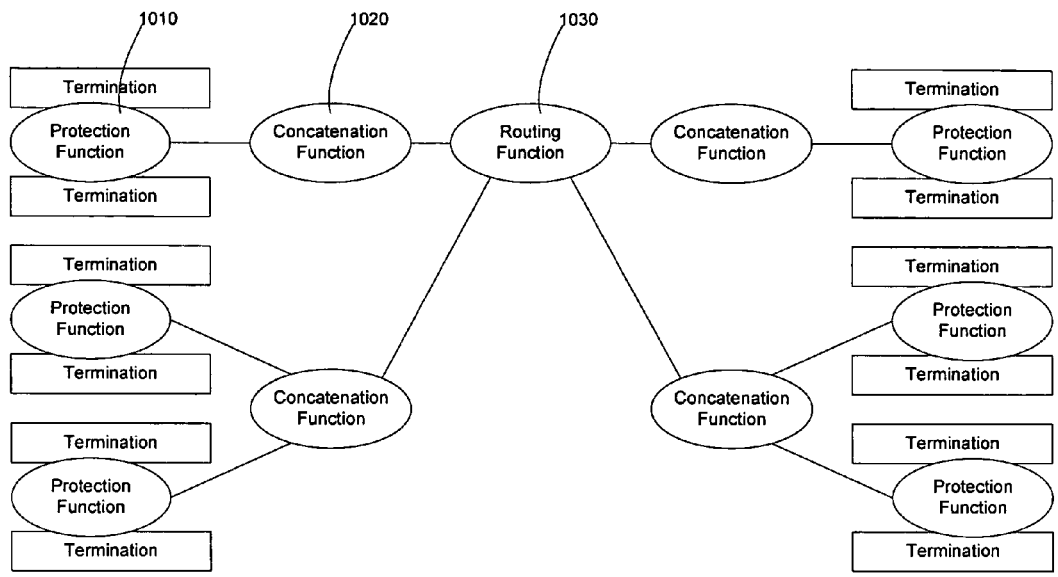
FIG. 10 is a functional block diagram illustrating different aspects of an optical connection that may be specified on an optical network.

FIG. 10 illustrates the complex problem space associated with defining connections on the network. In previous provisioning systems, the network manager would need to remember a particular string of characters that was used to name a particular type of connection. Specifically, each combination of protection type 1010, concatenation type 1020, and routing function 1030 was specified using a unique name. Thus, one way vs. two way routing, protected or non-protected, and other features associated with the connection, all would be specified by the network manager by causing the network manager to remember an acronym for the particular type of connection to be created.

The nodal connection details panel 920 of FIG. 9 enables the network manager to select the type of connection to be created from a drop down menu associated with the connection type combo box 930. Once the connection type is selected, the user may select which port and payload should be used for the A side termination and Z-side termination aspects of the connection. The port and payload for the connection may be selected by clicking on the select button 960 which will cause the port and payload selector dialog 1200 (see FIG. 12) to appear, as discussed in greater detail below. Depending on the type of connection being created, the user may also select A and Z-side switch mates as well. In the embodiment shown in FIG. 9, the nodal connection details panel 920 includes an A-side box 940 and a Z-side box 950. The A-side box 940 includes a first termination field 942 configured to enable the network manager to specify a first input termination port/payload. The A-side box 940 also includes a second termination field 944 configured to enable the network manager to specify a switch mate termination port. Selection of the ports and payloads to be used over those ports may be performed by clicking on the select button 960 and taking appropriate action in the port/payload selector dialog 1200 as described in greater detail below. Similar fields are used to select the termination for the Z-side box.

The connection that is built in the nodal connection details panel 920 will then be applied to the connection being shown in the connection build panel 910 so that the connection may be built without requiring the network manager to remember the particular strings required to implement particular types of nodal connections.

FIG. 11A shows a simplified problem space that may be created by enabling the constituent parts of a connection to be specified as the connection is built. FIG. 11B shows an example nodal connection details panel 920 via which a connection may be built by specifying the constituent parts of the connection so that an alphanumeric string describing the connection need not be provided to the optical provisioning system.

In the embodiment shown in FIG. 11B, routing will be specified when the user first begins defining the path. Specifically, since the entire path will be either one-way or two-way, the routing function will be specified by the network manager when the path is initiated. The nodal connection details panel of FIG. 11B has been graphically designed to capture the collapsed problem space illustrated in FIG. 11A so that a network manager may build connections as the paths are created. For example, as shown in FIG. 11B, the nodal connection details panel 920 includes an A-side box 940 and a Z-side box 950. The A-side box 940 includes a first termination field 942 configured to enable the network manager to specify a first input termination port. The A-side box 940 also includes a second termination field 944 configured to enable the network manager to specify switch mate termination information.

Additionally, in this embodiment, the A-side termination box 940 includes a protection type selector 946 configured to enable the network manager to specifically select the type of protection to be used on the A-side of the connection. Where the protection is set to "none" as illustrated, the switch mate termination input field 944 is not activated. If protection is turned on, the switch mate termination input field 944 will be activated to enable the network manager to select a port/payload for the switch mate. Similar fields are generated to be displayed on the Z-side of the nodal connection details panel. Concatenation may be specified in the port and payload selector dialog 1200 (described below) by causing multiple ports and/or multiple payloads to be selected for a given termination. Accordingly, by separating the protection function, concatenation function, and routing function, and enabling the user to specify these aspects of the connection individually, the manner in which the connection may be built within a node may be greatly simplified, so that the user does not need to remember the acronym used by the optical provisioning system to describe the particular type of connection that the network manager is trying to create.

Termination Selection

As part of the process of defining a connection through the network element, the network manager will need to perform port selection and select particular channels on the selected ports to populate the termination fields 942, 944, 952, and 954. For example, the network manager will need to select a port to be used for the connection termination and select the payload, e.g. specify the STS, VTG or VT, that should be used to carry the traffic over the optical links connected to the selected port. Current implementations require the user to type in the port ID or select the port from a drop down list, and also required the network manager to select the STS, VTG, and/or VT or select these aspects of a connection from drop down lists. Each of these operations requires multiple point and click operations which slows the process of provisioning a connection.

In one embodiment, a port and payload selector dialog box may be used to display the available ports and information associated with the ports so that port and payload selection may be simplified. Additionally, the same dialog may be used to graphically show payload selectors representative of the payload channels associated with the port, that are in use or which are available to be allocated to the connection. For example, the payload selectors may enable the dialog to show, graphically, the STS, VTG, and/or VT payloads that are extant on the port and that are allocated for use by other connections. Once a port is selected, the payload selectors for that port will be displayed to show the network manager which channels have been allocated and which remain available, so that the network manager may select a desired channel simply by clicking on a desired payload selector. By interacting with the payload selectors, the network manager may select channels for the connection. Since the payload selectors provide a graphical representation of the allocated payload on a port, the network manager may also determine whether fragmentation has occurred to determine if it may be advantageous to move some of the connections around to free up contiguous blocks of channels on the port before selecting particular channels for the connection.

Figure 12:
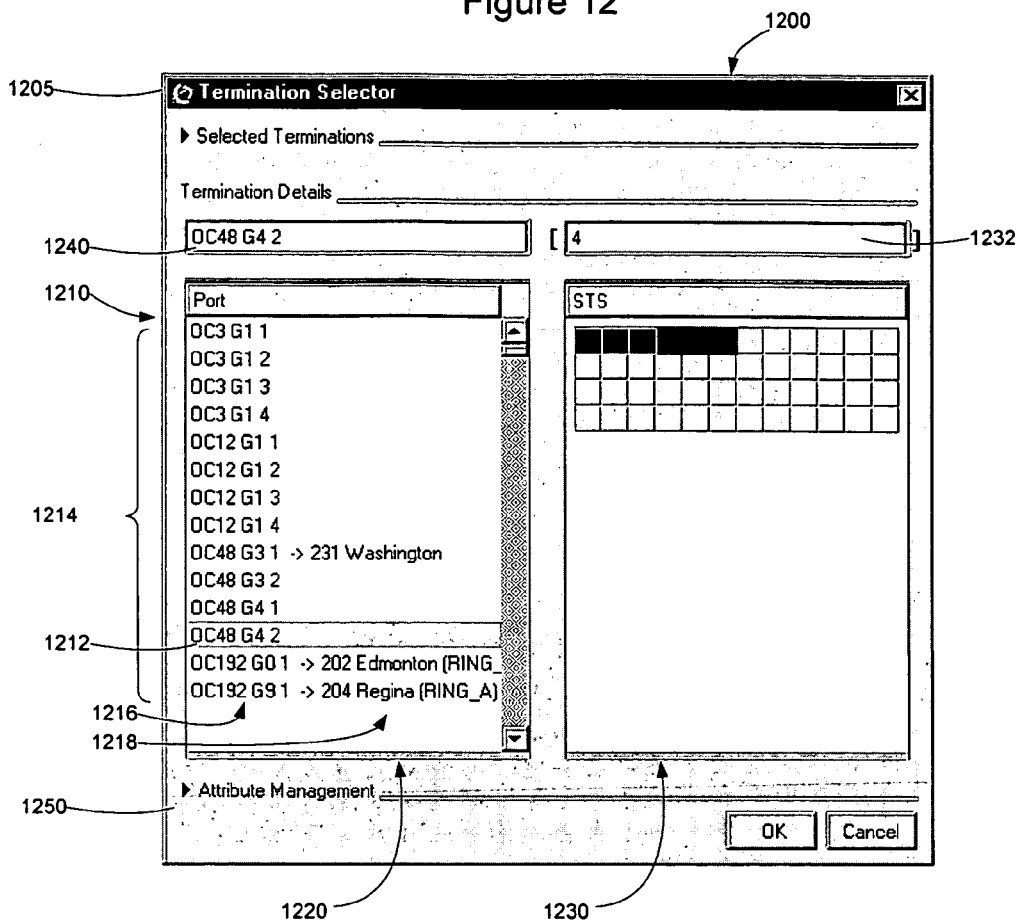
FIG. 12 is a port and payload selector dialog box that may be used to select channels to carry the services to be provisioned on selected connections according to an embodiment of the invention.

FIG. 12 shows an example of a port and payload selector dialog box 1200 that may be used to select ports and channels on the ports for a given connection. Other types of dialogs may be used as well. By using a dialog, a significant amount of information may be displayed since the amount of screen area that may be devoted to port and payload selection may be significantly increased relative to the amount of screen area allocated to the nodal connection details area 920. At launch time, whenever possible, the port and payload selector dialog will show the network element in context and the connection rate in context in the dialog header 1205.

Figure 17:
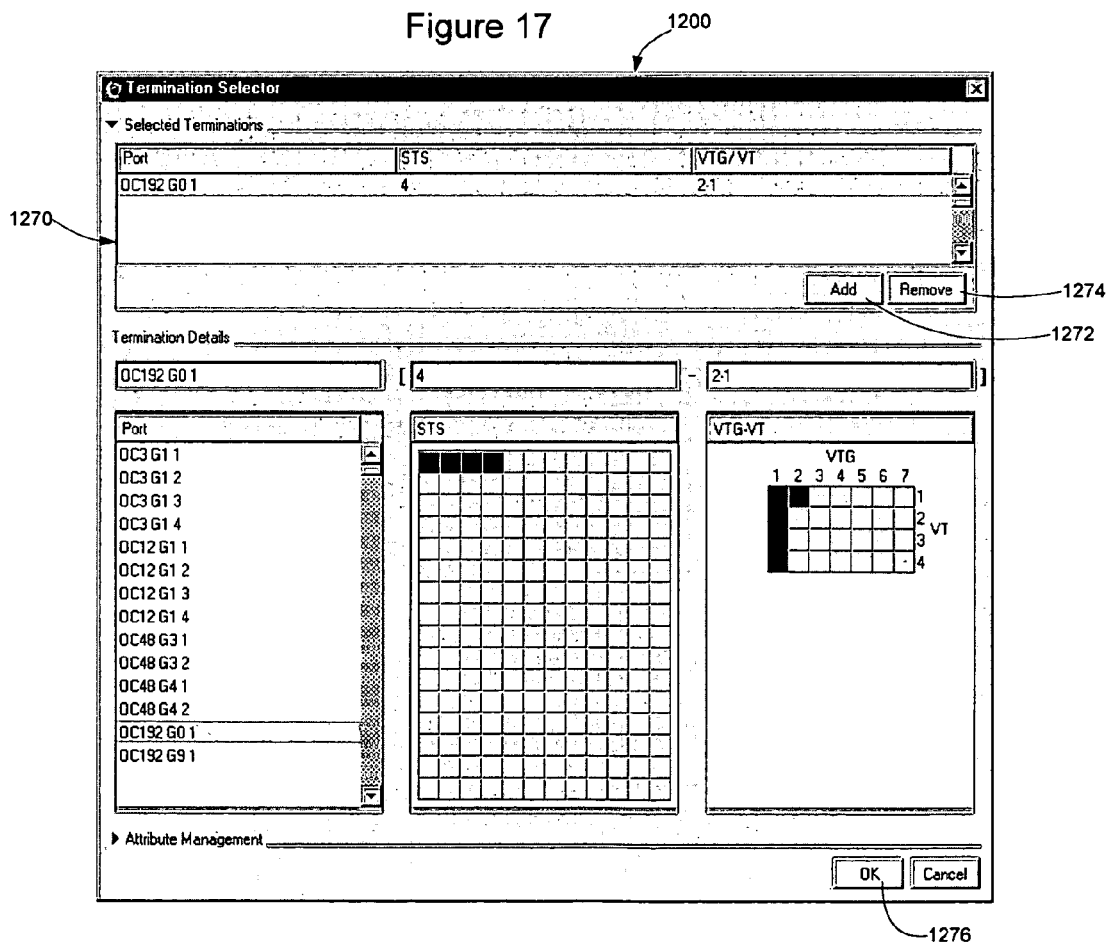
FIG. 17 is an example of a port and payload selector dialog in which a concatenation field is provided to enable multiple ports and/or channels to be added together for a particular termination according to an embodiment of the invention.

The port and payload selector dialog 1200 includes several panels depending on the implementation. For example, in the embodiment shown in FIG. 12, the port and payload selector dialog includes a termination details panel 1210 and an attribute management panel 1250. Additionally, as shown in FIG. 17, the port and payload selector dialog 1200 may also include a concatenation field 1270 configured to enable multiple ports and/or multiple payloads per port to be added to the termination being specified.

The termination details panel 1210 allows the user to select a port 1212 from a list of possible valid ports 1220. The list of ports may be filtered base on many factors, such as: network element, connection rate, connection type, termination type (A side/Z side/A side switch mate/Z side switch mate), etc. The attribute management area 1250 enables attributes of the connection to be specified, for example the network manager may specify alarm parameters, performance monitoring parameters, threshold specifics, and other attributes of the connection that may be of interest to the customer that requested that the service be provisioned. Enabling attributes to be input at the time the connection is built simplifies the process of defining the connection through the node since the network manager is not required to later go back and specify attributes for the connections at a later time. The invention is not limited to the particular way the attribute management area is implemented.

The termination details panel 1210 includes a port selector area 1220 and a payload selector area 1230, which may have several panels depending on the type and rate of the connection to be created. The port selector area enables the port for the termination to be selected and allows additional information associated with the port to be displayed to make it easier for the network manager to select the correct port from the list of available ports.

The standard port format used in the example shown in FIG. 12 is <port> (1216) <configuration name> (1218), although the port identification may also include other information associated with the port. For example, as shown in FIG. 12, the port details may indicate the next network element that is reachable over the port 1218 to simplify the process of selecting the correct port from the available ports. The <configuration name> is the name of the configuration the <port> belongs to, if the <port> is not in a configuration, the <configuration name> will not be displayed. The use of the configuration name and other information allows the network manager to determine, from the list of ports, where the ports connect to on the network. Optionally, a tooltip (not shown) may be displayed describing the format of the port.

Figure 13:
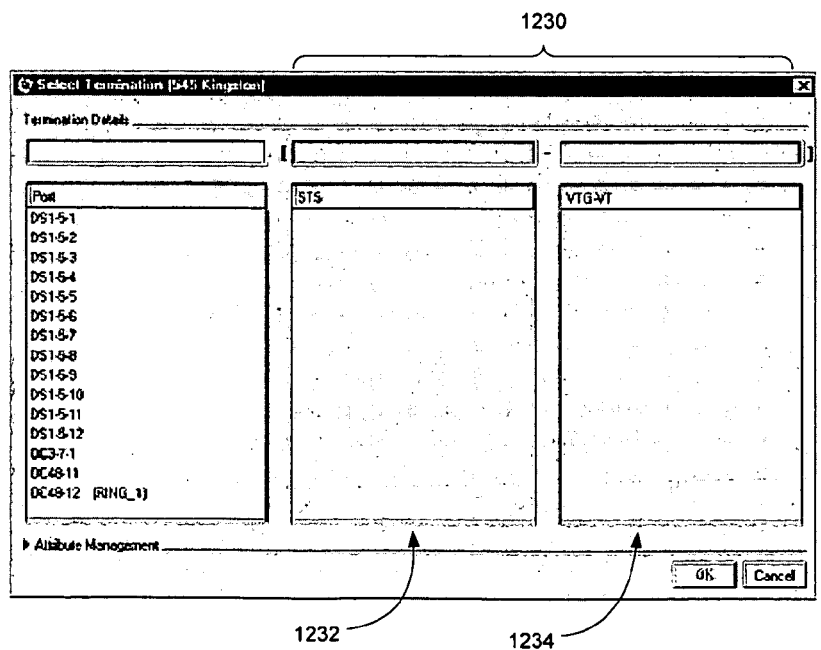
FIG. 13 is an example of the port and payload selector dialog box of FIG. 12 when service to be provisioned is a SONET service and the connection rate is a VT rate.

The look & feel of the termination details panel(s) is tightly coupled with two key factors: the display mode (SONET/SDH) and the connection rate. When the display mode is SONET and the connection rate >=STS-1, a STS payload selector area is displayed 1232, and the port and payload selector dialog 1200 is configured as shown in FIG. 12. When the display mode is SONET and the connection rate is a VT rate (VT1.5, VT2 or VT6), a STS payload selector 1232 and a VTG-VT (Virtual Tributary Group/Virtual Tributary) payload selector 1234 will be displayed in the payload selector area 1230, and the port and payload selector dialog is configured as shown in FIG. 13. Note that the VTG-VT grid (described below) will have different size for each VT rate. For example, for a VT rate of VT1.5, the grid will be 7×4, whereas for VT2 it will be 7×3 and for VT6 it will be 7×1. Other grid sizes may be used as well depending on the particular services being carried on the underlying optical connection and the manner in which the transport services are divided into blocks of bandwidth to be allocated.

Figure 14:
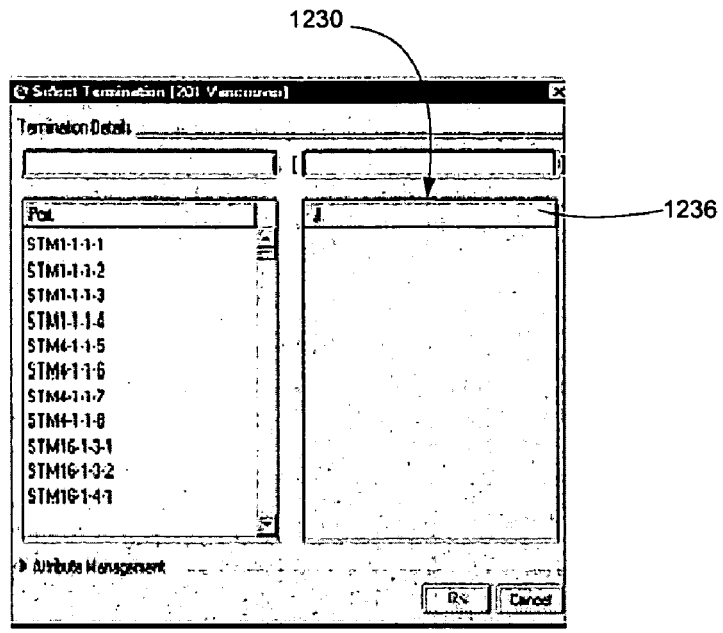
FIG. 14 is an example of the port and payload selector dialog box of FIG. 12 when service to be provisioned is SDH and the connection rate is >=VC4.

When the display mode is SDH, and the connection rate >=VC4, only the J payload selector 1236 is displayed in the payload selector area 1230. An example of the port and payload selector dialog as configured to implement this display mode is shown in FIG. 14.

Figure 15:
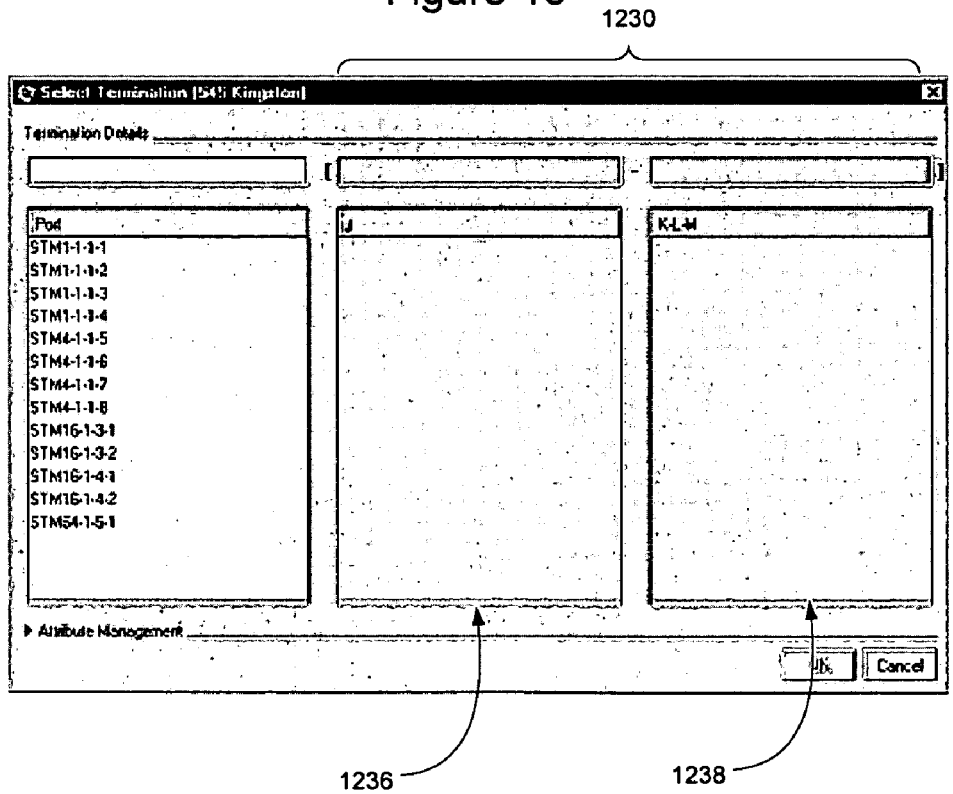
FIG. 15 is an example of the port and payload selector dialog box of FIG. 12 when service to be provisioned is SDH and the connection rate is VC11/VC12/VC2.

When the display mode is SDH, and the connection rate is VC3, the J payload selector 1236 and the K payload selector will be displayed (not shown); when rate is VC11/NVC12/VC2 the K payload selector will be replaced by a K-L-M payload selector 1238. An example of the port and payload selector dialog with J, K-L-M payload selectors (1236, 1238) displayed is shown in FIG. 15. Other payload selector panels may be used as well.

Figure 16:
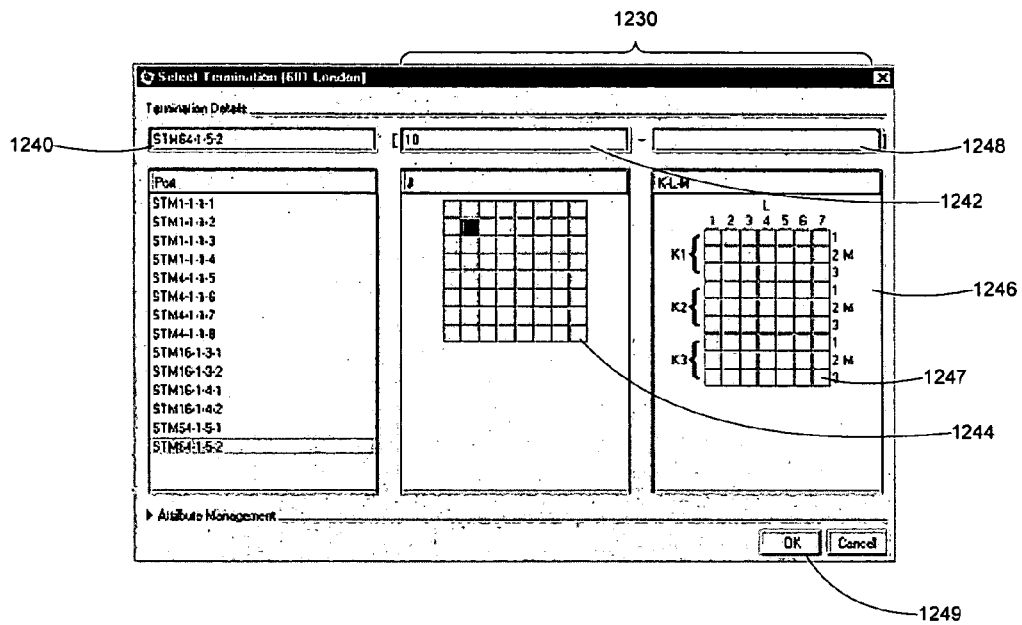
FIG. 16 illustrates an example of the port and payload selector dialog box of FIG. 12 in which payload selector grids are enabled in the payload selector areas.

FIG. 16 illustrates an example port and payload selector dialog in which the payload selector panels are shown displaying grids of payload selectors 1244, 1246. The payload selectors enable the network manager to visually determine which channels are available over a port and which channels have been allocated. The visual depiction of the payload selectors also enables the network manager to determine whether fragmentation of bandwidth on a particular port has occurred and whether it may be possible to provision the connection over the port by defragmenting the channel allocation to free up a contiguous block of bandwidth. The manner in which a user may select payloads using the payload grids shown in FIG. 16 will be described in the following example. The invention is not limited in this manner as other payload grids may be used in connection with the other payload selectors described above.

In the following example, it will be assumed that: the optical service provisioning system path editor window is open; the user is in the process of creating a path; the display mode is SONET; and the connection rate is a VT1.5. If the example were to select other parameters the particular dialogs selected to display information may be different and the invention is thus not limited to the following example.

In this example, when the user clicks on the select button 960 located beside the termination field 942 in the nodal connection details panel 920, the port and payload selector dialog 1200 is displayed. The port list box is populated with all the applicable ports. Depending on the type of connections that are available, appropriate payload selectors will be displayed. Since, in this example, the connections are SONET connections with a connection rate of VT1.5, payload selectors specific to that type of connection will be displayed.

When the user selects a port 1212 from the port selector area 1220 (as shown in FIG. 16), the selected port is displayed in the port text field 1240 and the STS payload selector 1230 and text field 1242 are enabled. The STS payload selector area contains the STS payload grid 1244. The unavailable STS payloads are shown in black or another contrasting color and, initially, the STS text field is empty since no STSs have been selected at this point. The VTG-VT payload selector area 1246 and text field 1248 remain empty and disabled as well.

When the user moves the mouse over the STS payload grid 1244, the borders of the STS that the mouse is on top of are changed to blue or another contrasting color so that the STS under the mouse is highlighted. A tool tip containing the STS number may optionally be shown as well.

If the user clicks on a particular STS, the selected STS will be shown in blue or another contrasting color in the STS grid 1244 and the selected STS will be displayed in the STS text field 1242. The VTG-VT payload selector area 1246 and text field 1248 for that STS will then be enabled.

The VTG-VT payload selector area 1246 contains the VT payload grid 1249. The unavailable VT payloads are shown in black or another contrasting color and the VTG-VT text field initially will be empty.

When the user moves the mouse over the VTG-VT payload grid 1247, the borders of the VT that the mouse is on top of will be changed to blue or another contrasting color (i.e. the VT is highlighted). Optionally, a tool tip containing the VTG and VT number may be displayed to help the user identify the particular block within the grid.

If the user clicks on a VT, the selected VT will be shown in blue or another contrasting color in the VTG-VT grid, and the selected VTG and VT will be displayed in the VTG-VT text field 1248. The OK button 1249 will then be enabled to enable the user to select these channels for the path. When the user hits the OK button, the selection will be finalized, the port and payload selector dialog will be closed, and the termination field will be updated with the selected port, STS, VTG and VT values.

By allowing the allocated and available payload areas to be shown graphically using payload selectors, the bandwidth usage and bandwidth fragmentation may be shown at a glance for a particular port. This allows the network manager to determine whether defragmentation may be viable to free up a contiguous block of bandwidth for a desired connection.

FIG. 17 shows an embodiment in which the port and payload selector includes a concatenation field 1270 via which multiple channels associated with a port and/or different ports may be selected to be added (concatenated) to specify a particular termination. As shown in FIG. 17, when a network manager is selecting a port and payload for a connection termination, the network manager may select a first desired port and channel and then click the add button 1272 to add the first port and payload to the termination. The network manager may then continue to select additional channel from that port to be concatenated with the earlier selected channel or may select a new port and channel to be concatenated to the earlier selection. Each time a port/channel is selected, it may be added to the previous selection to allow bandwidth from multiple ports/channels to be concatenated together to define the termination for the connection. Port/channel selections may also be removed by highlighting the selection to be removed and then clicking on the remove button 1274. Once a final selection has been made, the network manager may click on the OK button 1276 to cause the selection to be applied to the termination.

Visualization of Network Connection Topology

Not all network topology is known or knowable to the optical provisioning system. In particular, different vendors may not support discovery of network topology. Thus, the optical provisioning system will have partial knowledge of the network (implicit information) and the user will need to tell the optical provisioning system how the network is configured when the topology discovery system has failed to provide full knowledge of the network topology. The user specified network topology information will be referred to as explicit information.

In previous systems, where the topology was not known to the optical provisioning system, the network manager would need to exit the optical provisioning system and enter the required topology using another system. Accordingly, where a service was to be provisioned across an area where the network topology was unknown, the optical provisioning system would require the network manager to stop the provisioning process to enable the topology to be created via the separate system. As discussed in greater detail below, the optical provisioning system described herein enables a network manager to enter explicit topology information into the optical provisioning system that the network manager knows to exist but which is not known to the optical provisioning system. By enabling the network manager to enter explicit topology information into the optical provisioning system, the network manager may provision across areas of the network where implicit topology information is not available.

To graphically show how connections have been entered into the optical provisioning system, the optical provisioning system is configured to use different symbols to represent implicit continue information (e.g. information entered by the system) and explicit continue information (e.g. information entered by a user). This information may be displayed, for example, in the connection graphics panel 910 of FIG. 9 or wherever else inter-nodal topology is graphically depicted.

Figure 18:
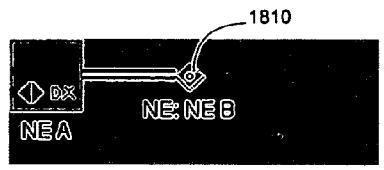
FIGS. 18-19 illustrate a graphical representation of adding a network element to a connection in which the underlying network topology is implicitly known.

An implicit continue implicitly uses available topological information, and in some cases previously provisioned high-order topology, to determine the next logical hop of the path. The user initiates an implicit continue by double clicking on an on-page connector 1810 as shown in FIG. 18. After performing an implicit continue, a new nodal connection is created on the next hop NE, with the appropriate port and payload information automatically populated in the new nodal connection based on the available topological information.

Figure 19:

An example of a connection created using implicit topology information is shown in FIG. 19. If the bandwidth at the next node is occupied by a connection with a different rate or the next node does not support the current rate then an error dialog will be presented to the user and the implicit continue will be disallowed. Consequently, the next hop NE is brought into view as shown in FIG. 19. If the implicit continue happens to traverse a high-order pipe the link icon will indicate this by selecting an appropriate icon. If the implicit continue encounters a connection on the next NE that has the same rate and channel as the connection being continued it will automatically continue through the existing connections and show them as provisioned according the nomenclature selected for those connections.

Figure 20:
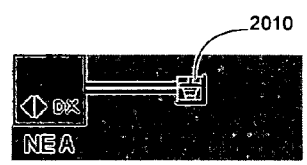
FIGS. 20 and 21 illustrate a graphical representation of adding a network element to a connection in which the underlying network topology is not implicitly known but explicitly stated.

An explicit continue is used in cases where there is a lack of topological information available for the particular port and the user wishes to continue the path across the resulting gap in topology. Such gaps in topology may occur naturally in multi-vendor networks. In such cases, an off-page connector 2010 (see FIG. 20) is used to denote this lack of topological information. It should be noted that the presence of an off-page connector does not necessarily mean that an explicit continue needs to be performed. It could indicate the end of the portion of the path that traverses equipment manufactured by a particular vendor. However if this is not the case, it is likely that the user will wish to perform an explicit continue in order to continue the path.

Figure 22:
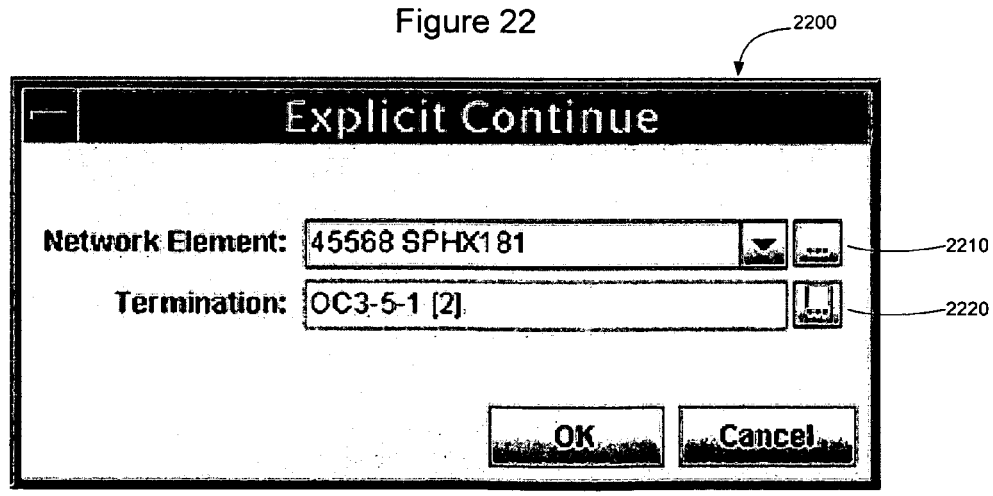
FIG. 22 is a dialog box that may be used to explicitly state a termination when the network topology is not implicitly known.

An explicit continue can be initiated by double clicking the off-page connector 2010. Upon initiating an explicit continue, an explicit continue dialog 2200 is generated, for example as shown in FIG. 22, which may be used to allow the user to specify the next NE in the path and the termination port. As shown in FIG. 22, the explicit continue dialog has a network element field 2210 where the user may input the identity of the next network element in the path, and a termination field 2220 that the user may use to input the termination for that network element.

Figure 21:
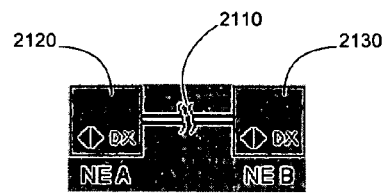

After specifying the next NE and its termination using the explicit continue dialog, the next hop is brought into view as shown in FIG. 21. The explicitly identified network element is shown connected to the rest of the path. However, to enable the display to make clear that the path is based on explicit topology information, an explicit connection indicator 2110 is used to connect the two network elements. The explicit continue indicator 2110 indicates that additional network elements may exist between the two entered network elements 2120 and 2130.

It should be understood that all functional statements made herein describing the functions to be performed by the methods of the invention may be performed by software programs implemented utilizing subroutines and other programming techniques known to those of ordinary skill in the art. Alternatively, these functions may be implemented in hardware, firmware, or a combination of hardware, software, and firmware. The invention is thus not limited to a particular implementation.

The functions described above may be implemented as a set of program instructions that are stored in a computer readable memory and executed on one or more processors associated with the computer platform configured to implement the optical provisioning system. However, it will be apparent to a skilled artisan that all logic described herein can be embodied using discrete components, integrated circuitry such as an Application Specific Integrated Circuit (ASIC), programmable logic used in conjunction with a programmable logic device such as a Field Programmable Gate Array (FPGA) or microprocessor, a state machine, or any other device including any combination thereof. Programmable logic can be fixed temporarily or permanently in a tangible medium such as a read-only memory chip, a computer memory, a disk, or other storage medium. Programmable logic can also be fixed in a computer data signal embodied in a carrier wave, allowing the programmable logic to be transmitted over an interface such as a computer bus or communication network. All such embodiments are intended to fall within the scope of the present invention.

It should be understood that various changes and modifications of the embodiments shown in the drawings and described in the specification may be made within the spirit and scope of the present invention. Accordingly, it is intended that all matter contained in the above description and shown in the accompanying drawings be interpreted in an illustrative and not in a limiting sense. The invention is limited only as defined in the following claims and the equivalents thereto.

What is claimed is:

1. A method of tracing a path or path group through a network by an optical management system having partially incomplete physical network topology information, the path or path group being defined by a set of nodal connections on the network that enable particular links on the network to be used to transport data from one side of the network to the other, the method comprising the steps of:
- selecting a first nodal connection through a first node on the path or path group to be traced, the nodal connection being one of the nodal connections defining the path or path group;
- ascertaining known physical network topology information associated with the nodal connection, the known physical topology information including link information associated with the nodal connection which the node uses to transport data on the network associated with the path or path group;
- partially tracing the path or path group using the known physical network topology information to identify related nodal connections through other nodes on the path to create a path segment where the known physical network topology information exists until a gap in physical network topology information is encountered, the gap in physical network topology representing a lack of information about how the network nodes are interconnected from a physical standpoint; and
- using connection information associated with the partially traced path or path group to determine a further portion of the path or path group beyond the gap in physical network topology information to continue tracing the path or path group through nodal connections beyond the gap in the physical network topology information.

2. The method of claim 1, further comprising the step of displaying a connection tree table containing information associated with nodal connections on the path or path group.

3. The method of claim 1, wherein the connection information contains at least one of connection ID information, rate information, and connection description information.

4. The method of claim 1, wherein the connection information comprises WAN port information, and wherein the step of using the connection information comprises using the WAN port information to trace multiple paths connected to the WAN port to form the path group.

5. The method of claim 1, further comprising the step of selecting a second connection associated with the path or path group and performing the steps of ascertaining, walking, and using in connection with the second connection to trace additional aspects of the path or path group.

6. A method of provisioning an optical service on a path through an optical network, the method comprising the steps of:
- provisioning, by an optical provisioning system, a first portion of an optical service across implicit topology in an optical provisioning system;
- entering explicit topology information into the optical provisioning system; and
- provisioning, by optical provisioning system, a second portion of the optical service across the explicit topology associated with the explicit topology information in the optical provisioning system;
- wherein the step of provisioning the first and second portions of the optical service are implemented by creating, by the optical provisioning system, a set of nodal connections within nodes on the optical network, the set of nodal connections interconnected by links, such that the collection of nodal connections and links enable data to be transported on the path through the network.

7. The method of claim 6, wherein the steps of provisioning, entering, and provisioning are performed in the same optical provisioning system without exiting the optical provisioning system.

8. The method of claim 6, wherein the implicit topology is topology information known to the optical provisioning system from network elements on the network.

9. The method of claim 6, further comprising the steps of:
- displaying a representation of a first portion of a path over which the first portion of the optical service has been provisioned and which is based on the implicit topology using a first path symbol; and
- displaying a representation of a second portion of the path over which the second portion of the optical service has been provisioned and which is based on the explicit topology using a second path symbol.

* * * * *